United States Patent [19]
Christie

[11] 3,905,700
[45] Sept. 16, 1975

[54] CLOSE-UP PHOTOGRAPHY SYSTEM

[76] Inventor: George L. Christie, 2250 D Halifax Dr., Ottawa, Ontario, Canada, K1G 2W6

[22] Filed: Jan. 2, 1974

[21] Appl. No.: 430,263

[30] Foreign Application Priority Data
Jan. 16, 1973   Canada............................. 161356

[52] U.S. Cl..................... 355/67; 240/1.3; 240/2 C
[51] Int. Cl. .......................................... G03b 27/54
[58] Field of Search .......... 355/67, 70; 240/1.3, 2 C

[56] References Cited
UNITED STATES PATENTS

| | | | |
|---|---|---|---|
| 1,822,220 | 9/1931 | Johnson................................ | 355/67 |
| 2,596,376 | 5/1952 | DeGoeij................................ | 355/70 |

Primary Examiner—John M. Horan
Attorney, Agent, or Firm—Browne, Beveridge, DeGrandi & Kline

[57] ABSTRACT

An apparatus is provided for taking close-up high magnification photographs of a subject with a camera having a variable aperture mechanism and an artificial light source. The apparatus includes means in combination with the camera for securely positioning and aiming the artificial light source in relation to the distance between the photographic film in the camera and the subject to be photographed. Rather than changing the aperture setting of the camera when there are changes in the subject-to-film distance, the distance between the light source and the subject is changed. The light source is positioned by index marks at different distances from the subject, these index marks representing changes in illumination equivalent to different camera aperture settings.

3 Claims, 2 Drawing Figures

CLOSE-UP PHOTOGRAPHY SYSTEM

My invention relates to a method and an apparatus for close-up photography. More specifically, the invention relates to an improved method and apparatus using a focusable lens with a mechanism to provide an aperture of variable cross-sectional area, and light-sensitive photographic film, together with a light source that is moveable to a predetermined location to vary the intensity of illumination of a subject. An indicator is provided to show the operator where to position the light source relative to a chosen point of magnification.

BACKGROUND OF THE INVENTION

The application of flash sources for illumination in close-up and low magnification macrophotography, is a relatively recent development. Several pieces of equipment have appeared on the market. The ring-shaped flash source mounted around the lens and moving with the lens is one of these. It is, however, expensive and requires a heavy power supply. Small electronic flash sources which use small batteries have also been mounted on the lens, to make the apparatus more portable. For reasons to be mentioned below, both of these prior art systems are incapable of producing correctly exposed photographs reliably, with an adequate depth of field over a wide range of photographic conditions. Any system in which a flash source, i.e., the source of illumination, moves with the lens carrier, leaves a photographer with little latitude for adjusting the exposure, while at the same time maintaining the depth of field needed to capture the maximum detail of the subject. Some automated systems have also been proposed, using electronic control. One such automatic system is that described in Canadian Patent 890,564 of Donald M. Harvey, which alters the exposure by increasing the lens aperture or opening above the minimum available of the lens used. The inevitable result of such an alteration is an undesirable reduction in the depth of field.

In those instances when a flash source is used for illumination of a photographic subject, the usual exposure calculation is made using a guide number (G.N.). The guide number represents quantitatively the number of photographic perameters, such as energy of the light source, sensitivity of the photographic film being used, optical characteristics of the subject, and so on. The mathematical relationship used for calculation purposes is:

$$f(\text{calculated}) = \frac{G.N.}{d(o)} \qquad \text{Equation 1}$$

where
  G.N. is the guide number supplied by the manufacturer of the light source used when photographing average subjects, eg., indoors in a room with light coloured walls;
  $f$(calculated) is the f stop to be set on the camera at low magnification;
  $d(o)$ is the distance from the light source to the subject being photographed.

This procedure is satisfactory when photographs are being taken at low magnification, that is, magnification less then 0.125. Magnification (M) is defined as the ratio of (size of the image)/(size of the object). When photographs are made a higher magnifications, however, that is at values greater than 0.125, it is necessary to correct the $f$(calculated) found by the application of equation 1. The correction is by a factor $(1 + M)$, where $M$ is the magnification as defined above, this correction being necessary to produce correctly exposed photographs. The relationship used to make the correction is:

$$f(\text{corrected}) = \frac{f(\text{calculated})}{1 + M} \qquad \text{(equation 2)}$$

where
  $f$(corrected) equals the $f$ stop to be set on the camera at higher magnification;
  $f$(calculated) equals the $f$ stop as calculated from equation 1.

A relationship known in optics for computing the distance from the subject to the image in a simple system using a thin lens, is represented by the equation:

$$D = F\left(2 + M + \frac{1}{M}\right) \qquad \text{(equation 3)}$$

where
  $D$ = distance from object to image; $F$ = focal length of the lens used; $M$ = magnification as defined above.

In the case of a lens made up of many elements, a correction may be made for the internodal distance of the lens. The correction will have the effect of increasing the value of $D$ by a small amount, $C$, which is a constant for a specific lens. So that $$D = F\left(2 + M + \frac{1}{M}\right) + C \qquad \text{(equation 4)}$$

When a desired magnification is set on a camera lens assembly, by selecting one of a series of numbers displayed thereon, and the camera is brought into focus on a subject, the relationship of equation 4 above will represent acurately the distance from the subject being photographed to the plane of the light-sensitive film which itself will be coincident with the focal plane of the lens assembly in that camera. When the subject is in focus at the magnification chosen, the positions of all parts of the camera with respect to the subject, are fixed. Thus, the camera lens assembly so used becomes an accurate range finder. If a value for the magnification M within the range of the camera lens assembly, and the value of f(corrected) is assumed, say, $f$ 22, these values when substituted into equation 2 above will enable f(calculated) to be found. Substitution of this value of $f$(calculated) and of the Guide Number (G.N.) as supplied by the manufacturer of the light source, into equation 1, will yield a value for $D(o)$ or the distance from the light source to the subject, which should be used to expose the light-sensitive film correctly using the magnification and $f$ stop so assumed. Thus, at a constant magnification the camera lens assembly can be used as a range finder. All that remains for obtaining correct exposure of that film is the positioning of a light source on the camera so that it will be at the calculated distance D(o) from the subject, when that subject is in focus at the magnification chosen. For any other magnification M of course, the calculated position required of the light source will be different.

It is a common practice among photographers to make adjustments to the exposure given to flash photographs, as calculated from equations 1 and 2 above. The magnitude of that adjustment depends upon photographic factors recognized by the photographer as being different from the conditions assumed by the manufacturer in assigning a Guide Number to a particular light source, or source of illumination. It is usual under these circumstances to make an adjustment to the f stop aperture of the lens. This adjustment is based commonly on the experience of the photographer, and frequently is in the direction of increasing the $f$ stop aperture above the value calculated from equations 1 and 2. For close-up work this will be recognized by persons skilled in the photographic arts, as being undesirable. Increasing the $f$-stop aperture automatically increases the effect of ambient light, and further decreases the depth of field, which is already shallow in close-up photographic work.

SUMMARY OF THE INVENTION

For purposes of the following disclosure of my invention, I will assume that close-range photographs are taken at a small lens aperture, at $f$ 22, for example, using artificial illumination such as an electronic or strobe flash light. This invention is not to be limited to photography using only that $f$ 22 lens aperture, since it is contemplated herein that other lens apertures can also be used within the scope of my invention. This will be apparent from the detailed description below.

For present purposes, I will assume that the $f$ (corrected) in equation 2 above is $f$ 22 for photographs taken at higher magnification. The use of a small lens aperture produces a larger depth of field, and will also reduce the effect of ambient light on the exposure of the light-sensitive photographic film. This is a definite advantage in situations where flash photographs are taken with a second light source present, for example outdoors in sunlight. The increased depth of field and reduction in the effect of ambient light represents very desirable improvements, as will be recognized by persons skilled in this art.

According to my invention, the procedure of assuming in the first instance, a convenient f-stop aperture is a departure from the practice usually followed. In other words, it has been the practice previously to measure the distance from the light source to the subject, and then calculating the f-stop aperture required, assuming a fixed light source and using equation 1 above. That calculation is then corrected using equation 2 if the magnification is high. Alternatively, in order to avoid these calculations many photographers in the past have found practical solutions using trial and error methods. Both of these approaches have been time consuming, inefficient, and in many cases impractical. These previous approaches have not been particularly acceptable, because the success or failure of the technique chosen was not apparent until after the exposed film had been processed. It is, of course, of little consolation to a photographer to learn the technique used was erroneous, and that, as frequently happens, the subject is no longer available for another attempt at photographing it with a correct exposure of the film. On the other hand, with my invention, the light source or source of illumination is supported in a manner that makes it adjustable selectively, thereby making that source positionable at a distance from the subject being photographed to provide maximum illumination over a wide range of magnifications and subjects. The usual series of $f$-stop settings used on an average camera having a variable aperture represents a ratio of 2, in the quantity of light admitted to a photographic film for any pair of adjacent settings in the series 2.0, 2.8, 4.0, 5.6, 8.0, 11.0, 16.0, 22.0, and 32.0, when other photographic parameters are held constant. Thus, in accordance with my invention and consistent with conventional photographic practises, I provide a light source moveable to be located at a series of predetermined locations which each represent a calculated distance from the light source to the subject being photographed. The distance between any two calculated positions of the light source are computed, for the conditions of a preselected magnification, to represent a change by a constant factor in the quantity of illumination received by the subject, with all other photographic perameters again being held constant. The distance calculated represents a change in exposure equivalent to one $f$-stop for example, in exposure even though the $f$-stop aperture setting of the lens has not been changed from the preselected small value (assumed here to be $f$ 22). In other words, the change in the distance from the light source to the subject represents a change in the amount of illumination received by the subject, and has the same effect as changing the size of the lens aperture, without actually doing the latter. Such computations are obtained using the inverse square law, or by any other law of physics applicable to the lens apparatus being used. The position of the light source to provide a one half stop change in illumination can similarly be computed.

If D(o) is the distance from the light source to the subject, as calculated from equations 1 and 2 above for an assumed $f$-stop ($f$ 22 for instance) and a specific magnification M, a change in exposure of any number of $f$-stop is obtained by multiplying the distance D(o) by a mathematically computed factor, thus to obtain a new position of the light source necessary to change the amount of illumination of the subject by any required amount. Such positions can be plotted, for example, on a flat plane which is used as a locating means to indicate the position at which the source of illumination is to be placed. More preferrably, however, such positions are plotted on a plane which is then formed into a cylinder or rod-like form which functions as the locating means just mentioned, and is attachable more readily to a camera or lens assembly. If the above mentioned inverse square law is used, for example, a new position for the light source is calculated for a specific magnification M from the $d(o)$ for the same magnification by using the equation:

$$d(n) = d(o) \times 2^{+n/4}$$

(equation 5)

where $d(o)$ = the distance from the light source to a subject, as obtained by evaluating equations 1 and 2 above for a specific magnification, guide number, and $f$-stop aperture;

$n$ = the number of half-stop changes in exposure;

+n is used to calculate a decrease in exposure from that with the light source at $d(o)$;
−n is used to calculate an increase in exposure from that with the light source at $d(o)$;
$d(n)$ = light source to subject distance with n half stops change in exposure from the exposure given with the light source at $d(o)$.

Thus, equation 1 is restated in its equivalent from $$G.N. = d(o) \times f(\text{calculated}) \qquad \text{Equation 1}$$

and the value of $f(\text{calculated}) = f(\text{corrected})(1 + M)$ from equation 2, and $do = dn/2^{(\pm n/4)}$ from equation 5 are substituted into equation 1, the following expression is obtained:

$$d(n) = \frac{G.N. \times 2^{(\pm n/4)}}{f(\text{corrected})(1 + M)} \qquad \text{Equation 6}$$

This is a general expression representing the positioning of the light source to illuminate a subject correctly when G.N., f(corrected), magnification and photographic conditions are considered as mathematical variables. If the G.N. supplied by the manufacturers of the light source is used and a suitable value of f(corrected) is assumed, (I have used f22 in my examples), equation 6 may thus be evaluated for a specific magnification when $n = 0$, to give $d(o)$, the distance from the light source to the subject required to expose film correctly under the chosen conditions. The distance from the light source to the subject required either to increase or decrease exposure from that given when $n = 0$ (i.e. when the light source to subject distance $= d(o)$), may be found by carrying out a similar calculation with n assigned values that are integral numbers in the series h, (h−1), . . . 2, 1, 0, −1, −2, −3, . . . −(k + 1), −k to give a series of values for $d(n)$.

Any two adjacent values in this series of values of distances of the light source from the subject represent, for a specific light source, one half-stop change in exposure at a constant f-stop aperture, and constant magnification.

If the illumination of the subject by the light source follows any other mathematical law, a similar type of computation may be made.

It is seen, accordingly, that the value of D in the expression $$D = F\left(2 + M + \frac{1}{M}\right) \qquad \text{Equation 3}$$

will vary as $M$ and $F$ are varied. It can be proved mathematically that for any specific lens, the value of D will be a minimum when $M = 1$, so that $$D(\min.) = 4F \qquad \text{Equation 7}$$

where
$D(\min)$ = distance between the plane of the film and the subject when $M = 1$; and
$F$ = the focal length of the lens used.

Over the magnification range from close-up to low magnification macro, where my invention is particularly useful, the value of M will vary from less than one, to greater than one, and the value of D as defined by equation 3 will pass through the minimum given by equation 7.

With any photographic assembly where a single light source delivering a beam of light is used for illumination, it is necessary to aim the beam of light accurately at the subject. That is, the subject normally is to be illuminated directly, as opposed to being shaded. With my invention, this is accomplished for any lens by an adjustment of the angle that the optic axis of the light source makes with the optic axis of the camera assembly, in order to pass the optic axis of the beam of light through the point $D = F(2 + M + 1/M)$ measured from the plane of the film on the optic axis of the camera lens assembly and in the direction of the subject.

In accordance with one aspect of my invention, there is provided in an apparatus suitable for close-range photography of a subject, the apparatus being adapted to support a moveable source of illumination, a focusable lens that is positionable at selected distances from the subject a mechanism for providing an aperture of variable cross-sectional area for exposing said lens, and a photographic film, said film, aperture and lens being optically alignable for transmitting an image of said subject onto a focal plane coincident with the film; the improvement comprising locating means in operative relation to said source of illumination, the locating means having a plurality of index positions thereon each defining a position to which said source is moveable selectively while said lens maintains a substantially constant depth of field for selected amount of magnification of the subject.

Various features and advantages of my invention will become apparent from the following description, as read in conjunction with the accompanying drawings. These drawings illustrate by way of example only, one preferred form of apparatus embodied by my invention.

DESCRIPTION OF THE PREFERRED EMBODIMENT

Figure 1:
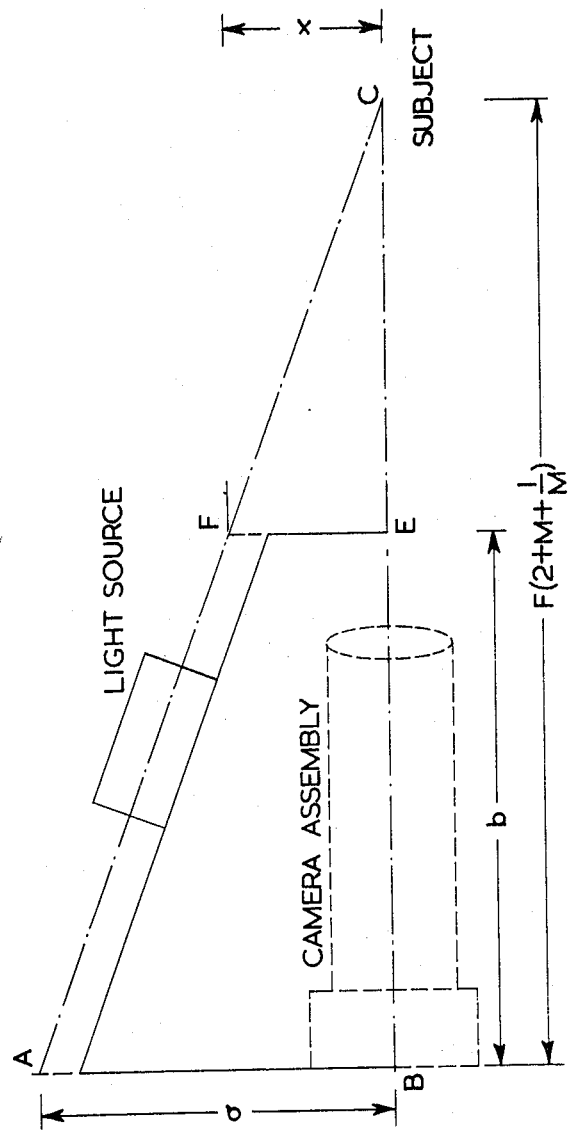
FIG. 1 is a schematic drawing illustrating the spacial relationship between a subject being photographed at close-range, a light source used to illuminate that subject and a camera which houses a lens assembly and a light-sensitive film on which an image of that subject is to be exposed.

With reference to FIG. 1, the mode of calculation of the vertical adjustments required in order to aim the beam of light delivered by a source of illumination at a subject for any lens, and for any magnification, is as follows. The line B C represents an optic axis of the camera and lens assembly 2. A light-sensitive photographic film is carried in the camera with the plane of the film being coincident with the line shown at AB. The subject is located at point C. The line AC represents an optic axis of a light source 4 which is moveable over some portion of the distance AC, for example, to point F shown in FIG. 1.

The distance BC represents the distance from the subject to the plane of the photograhic film, as given in equation 3 above. The length $a$, $b$ are fixed, and are dependent upon the physical size of the camera and lens assembly 2. The distance $x$ represents an adjustable perameter that can be altered to adjust the size of the angle of ACB. This distance $x$ is the distance from E to F, as seen in FIG. 1.

With reference to FIG. 1 it can be established from the trigonometry of similar triangles that:

$$\frac{a}{F\left(2+M+\frac{1}{M}\right)} = \frac{x}{F\left(2+M+\frac{1}{M}\right)-b}$$

or $$x = a - \frac{a}{\left(F\ 2+M+\frac{1}{M}\right)} \quad \text{Equation 8}$$

In some instances, the vertical adjustment required to aim the beam of light delivered from the source of illumination, accurately at the subject is small, as the magnification is varied over the range of magnifications available on the camera and lens assembly 2 being used. Frequently under these conditions, no vertical adjustment is needed since a cone of uniform intensity of illumination of a light source delivering a beam of light will illuminate a small subject over a wide range of magnifications. In those instances, the angle ACB may be set to aim the light source or more specifically the axis of the cone of uniform illumination received therefrom, at a mid-point of the range of distances calculated from equation 3, with no further adjustment being required.

Figure 2:
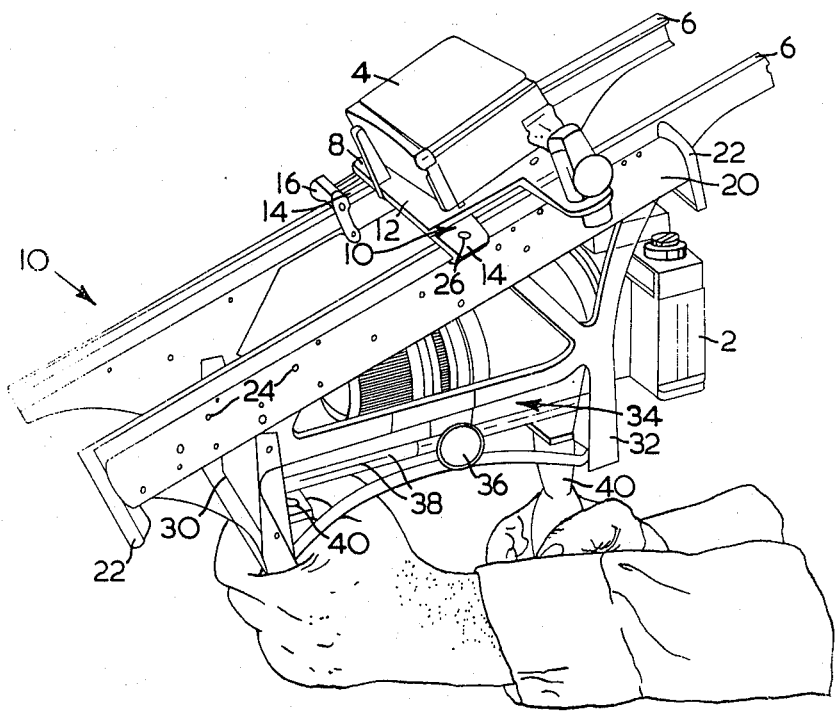
FIG. 2 is a perspective drawing showing a preferred form of apparatus embodied by my invention and providing the spacial relationship of the parts illustrated schematically in FIG. 1.

Turning now to FIG. 2, there is shown overall at 10 a preferred form of apparatus encompassed by this invention. This apparatus 10 is viewed in perspective as seen from the left, or subject-facing end thereof. In accordance with one aspect of the invention, the apparatus 10 is adapted to support a camera and lens assembly 2, as well as a source 4 of illumination. The source 4 of illumination is preferably an electronic flash, and this source is carried by the apparatus 10 in a manner which enables selected positioning of that source at various distances from a subject being photographed.

The apparatus 10 shown in FIG. 2 comprises a pair of spaced apart, parallel rails 6, each of which may be I-shaped in cross-section, or alternatively, of a T-shaped cross-section. The rails 6 are spaced apart equidistant, and extend longitudinally in a direction parallel to the optic axis represented in FIG. 1 by line AC. The source 4 of illumination is moveable along the rail 6, more specifically, being releasably supported on a carrier 8. The carrier 8 comprises briefly, a pair of cross members 10 which are spaced apart and interconnected by a base plate 12 on which the source 4 of illumination is carried. The cross members 10 have U-shaped extremities 14 that are adapted to engage the rail 6 for sliding movement. Also provided on the carrier 8 is locking means 16 preferably in the form of a thumb screw or other such arrangement by which the carrier can be releasably fixed in a selected position with respect to the rails 6.

Associated with one of the rails 6 is an elongated member 20 that preferably is rod-like in form. A pair of mounting brackets 22 are connected to one of the rails 6 in order to mount the elongated member 20 adjacent to, and generally in alignment with that one of the guide rails 6. The mounting brackets 22 include a ratchet assembly to support the elongated member 20 for rotation about an axis coincident with the longitudinal axis of that member, for reasons which will become apparent shortly. The elongated member 20 is provided with a plurality of index marks 24 which are located in a series of paths extending longitudinally of the member 20. Each of the index marks 24 common to one of the paths just mentioned is located at a position which represents the calculated distance from the source 4 of illumination to the subject, as derived from equation 6 set out above. The U-shaped extremity 14 of the cross member 10 which engages the particular rail 6 from which the elongated member 20 is supported, is itself provided with a location indicator 26. This location indicator 26 is intended to be brought into alignment with a selected one of the index marks 24 so as to position the source 4 of illumination selectively at a particular location corresponding to the distance from the subject of the lens assembly of camera 2, for the particular magnification M which has been selected. It will be recognized that as stated earlier, repositioning of the source 4 of illumination in alignment with another one of the index marks 24 will have the effect of varying the intensity of illumination of a subject being photographed, while the depth of field of the lens assembly of camera 2 remains constant, irrespective of the particular magnification M which has been selected.

The rails 6 are connected by a pair of front and rear brace assemblies 30 and 32. These two brace assemblies 30 and 32 are spaced apart longitudinally with respect to the rail 6, and serve to carry second mounting means in the form of a base plate 34 on which the camera and lens assembly 2 are adapted to be removably mounted. The base plate 34 is configured to accomodate adjustable positioning of the camera and lens assembly 2 in order to effect a variation in the magnification M of the subject by the lens assembly of camera 2. The lens assembly of camera 2 is moveable in a direction parallel to the optic axis thereof, as represented by line BC of FIG. 1. It is thus recognized that the paths along which the source 4 of illumination and the lens assembly of camera 1 are moveable are positioned in planes which intersect to define therebetween an angle represented by the angle BCA of FIG. 1.

The base plate 34 is provided with a thumb wheel 36 having means thereon which, for instance, engage a complementally configured edge or surface of the plate 34 to enable adjustable positioning of the lens assembly of camer 2. The thumb wheel 36 can, for example, be associated with a simple rack and pinion arrangement, or some other arrangement known per se, by which the lens assembly of camera 2 is positionable to vary the magnification of the subject by lens assembly of camera 2 has a fixed focal length, equations 3 and 7 above will indicate that a change in magnification M is synonomous with a change in the distance D between the plane of the light-sensitive film to be exposed and the subject. Thus, by virtue of thumb wheel 36, the lens assembly of camera 2 can be positioned at one of a plurality of selected locations 38, each of which represents from equations 3 and 7 varying amounts of magnification of the subject.

Associated with the brace assemblies 30 and 32 and the base plate 34 are a pair of handles 40. The handles 40 facilitate holding and "aiming" of the apparatus 10 in a manner which enables placement of the subject to be photographed at a position corresponding generally to the intersection of the optic axis of the source 4 of illumination and of the lens assembly of camera 2. There is also provided on the base plate 34 an arrangement (not shown) by which the apparatus 10 can be fixedly supported, say, on a tripod.

In using the apparatus 10 described above, a procedure now to be outlined is followed:

STEP 1

The camera synchronization is set for the particular type of source of illumination being used, and that source is connected to the camera.

STEP 2

The lens aperture or $f$-stop is set to the desired value of $f$(corrected) to give the maximum depth of field for the particular lens being used.

STEP 3

The magnification wanted is established either by measurement, if the subject can be approached, or by estimation if the subject cannot be approached, that magnification M being set by adjustably positioning the lens assembly or camera by manipulation of the hand wheel which causes movement of the base element on which it is mounted.

STEP 4

The elongated member used for precise positioning of the source of illumination is manipulated to display the series of index marks applicable to the magnification M chosen in step 3 above, and computed previously using equation 6.

STEP 5

The source of illumination is positioned by movement of the carrier on which it is mounted, to bring the location indicator into alignment with a particular one of the index marks $d(o)$. It is noted that although such positioning of the location indicator at $d(o)$ is calculated for one set of photographic perameters, the position of the source of light and the resulting intensity of illumination of the subject may be adjusted further, at the discretion of the photographer, to correct for unusual photographic conditions. That further adjustment is made by aligning the location indicator with any other one of the index marks $d(n)$ in the series of paths of index marks displayed on the elongated locating member of step 4 above. Such repositioning either increases or decreases the intensity of illumination of the subject from that illumination received with the light source at $d(o)$. when the position of the source of illumination is adjusted in this way, no alteration is made to the $f$-stop aperture from that required to give the maximum depth of field of the particular lens being used.

STEP 6

The subject is approached and the photograph taken when the subject is in focus.

It will be recognized by one skilled in this art, that if it is desired to expose a light-sensitive photographic film at any $f$-stop aperture other than that for which equation 6 above was computed, and retain maximum depth of field, this can be done by increasing the lens aperture one stop. Thus, for example, the lens aperture could be moved from $f22$ to $f16$, with a corresponding reduction in the illumination of the subject obtained by moving the light source away from the subject the equivalent of one stop, and aligning the location indicator above the appropriate index mark as displayed on the elongated locating member 20 of FIG. 2.

The foregoing disclosure has described a preferred embodiment of apparatus encompassed by this invention. Those skilled in this art will readily visualize some variations and modifications, for instance, in the specific form of the means by which each of the source of illumination and lens assembly are adjustably positionable relative to a subject being photographed. All such changes and modifications as would be apparent to those persons are intended to be included in the spirit of this invention, as encompassed by the claims below.

I claim:

1. An apparatus for taking close-up high magnification photographic exposures of a subject with a camera having a photographic film, a focusable lens, a variable aperture mechanism and an artificial light source; said apparatus comprising a frame having a base member for mounting said camera thereon; support members extending upwardly from the base member and rail means on the support members and angled with respect to the base member; means for mounting an artificial light source moveably on the said rail means; means for locating the position of said mounting means along the length of the said rail means; and a rotatable, interchangeable cylindrical member removably secured to the frame and associated with the rail means and displaying a plurality of index marks at which said location means can be selectively aligned; the index marks displayed on the cylindrical member representing different aperture settings equivalent to the changes in distance between the light source and the subject to provide the required intensity of illumination.

2. The apparatus claimed in claim 1, wherein the index marks displayed on the said cylindrical member represent the required distance between the subject and the source of illumination for a given lens aperture to effect correct illumination of the said subject.

3. The apparatus claimed in claim 1 wherein the said rail means comprises a pair of spaced, parallel rails which decline on a plane of approximately 72° from the vertical plane of the said photographic film in the said camera.

* * * * *